(12) United States Patent
Flautt et al.

(10) Patent No.: US 6,849,331 B1
(45) Date of Patent: Feb. 1, 2005

(54) POLYESTER RESIN STRING BINDER

(75) Inventors: Martin C. Flautt, Granville, OH (US); James R. Priest, Nashport, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 117 days.

(21) Appl. No.: 09/721,356

(22) Filed: Nov. 22, 2000

(51) Int. Cl.$^7$ .................................................. D02G 3/00
(52) U.S. Cl. ....................... 428/375; 428/364; 428/378; 428/392; 428/395
(58) Field of Search ................................. 428/375, 378, 428/395, 364, 392

(56) References Cited

U.S. PATENT DOCUMENTS

| | | | |
|---|---|---|---|
| 3,936,285 A | 2/1976 | Maaghul | |
| 4,029,623 A | 6/1977 | Maaghul | |
| 4,038,243 A | 7/1977 | Maaghul | |
| 4,156,668 A | 5/1979 | Dunbar et al. | |
| 4,283,322 A | 8/1981 | Temple | |
| 4,301,052 A | 11/1981 | Pollman | |
| 4,338,233 A | 7/1982 | Das et al. | |
| 4,338,234 A | 7/1982 | Moore et al. | |
| 4,341,877 A | 7/1982 | Das et al. | |
| 4,374,177 A | 2/1983 | Hsu et al. | |
| 4,382,991 A | 5/1983 | Pollman | |
| 4,394,418 A | 7/1983 | Temple | |
| 4,410,645 A | 10/1983 | Das et al. | |
| 4,435,474 A | 3/1984 | Das et al. | |
| 4,457,970 A | 7/1984 | Das et al. | |
| 4,487,797 A | 12/1984 | Watson | |
| 4,504,619 A | 3/1985 | Chang et al. | |
| 4,546,880 A | * 10/1985 | Reese | 206/410 |
| 4,592,956 A | 6/1986 | Gaa et al. | |
| 4,596,736 A | * 6/1986 | Eichhorn et al. | 428/215 |
| 4,596,737 A | 6/1986 | Werbowy et al. | |
| 4,626,289 A | 12/1986 | Hsu | |
| 4,681,802 A | 7/1987 | Gaa et al. | |
| 4,683,254 A | 7/1987 | Brannon et al. | |
| 4,728,573 A | 3/1988 | Temple | |
| 4,808,478 A | 2/1989 | Dana et al. | |
| 4,822,826 A | 4/1989 | Pommier et al. | |
| 5,085,938 A | 2/1992 | Watkins | |
| 5,091,465 A | 2/1992 | Dana et al. | |
| 5,130,197 A | * 7/1992 | Temple | 428/378 |
| 5,272,195 A | * 12/1993 | Hagenson et al. | 524/188 |
| 5,380,580 A | 1/1995 | Rogers et al. | |
| 5,397,483 A | * 3/1995 | Porter et al. | 252/8.8 |
| 5,409,573 A | 4/1995 | Weeks | |
| 5,413,847 A | 5/1995 | Kishi et al. | |
| 5,437,928 A | 8/1995 | Thimons et al. | |
| 5,491,182 A | * 2/1996 | Key et al. | 523/206 |
| 5,605,757 A | 2/1997 | Klett | |
| 5,872,067 A | 2/1999 | Meng et al. | |
| 5,883,021 A | 3/1999 | Beer et al. | |
| 5,883,023 A | 3/1999 | Martine et al. | |
| 5,908,689 A | * 6/1999 | Dana et al. | 428/219 |
| 5,910,458 A | 6/1999 | Beer et al. | |
| 5,911,932 A | 6/1999 | Dyksterhouse | |
| 6,020,063 A | 2/2000 | Riffle et al. | |
| 6,045,898 A | 4/2000 | Kishi et al. | |
| 6,099,910 A | * 8/2000 | Woodside | 427/386 |
| 6,139,955 A | 10/2000 | Girgis | |

FOREIGN PATENT DOCUMENTS

WO    WO 00/58233    10/2000

* cited by examiner

Primary Examiner—B. Hamilton Hess
Assistant Examiner—C Thompson
(74) Attorney, Agent, or Firm—Inger H. Eckert; Maria C. Gasaway

(57) ABSTRACT

A string binder is disclosed which is useful for making reinforcing articles for use in the manufacture of molded composite articles. The string binder comprises a fibrous substrate with chemical treatment, applied thereto, comprising a polyester resin, a curing agent, a film former, and a thickener. Additionally, the string binder may be co-roved with one or more ends of a separate fibrous pre-form material to make a product suitable for use in various molding applications.

11 Claims, 1 Drawing Sheet

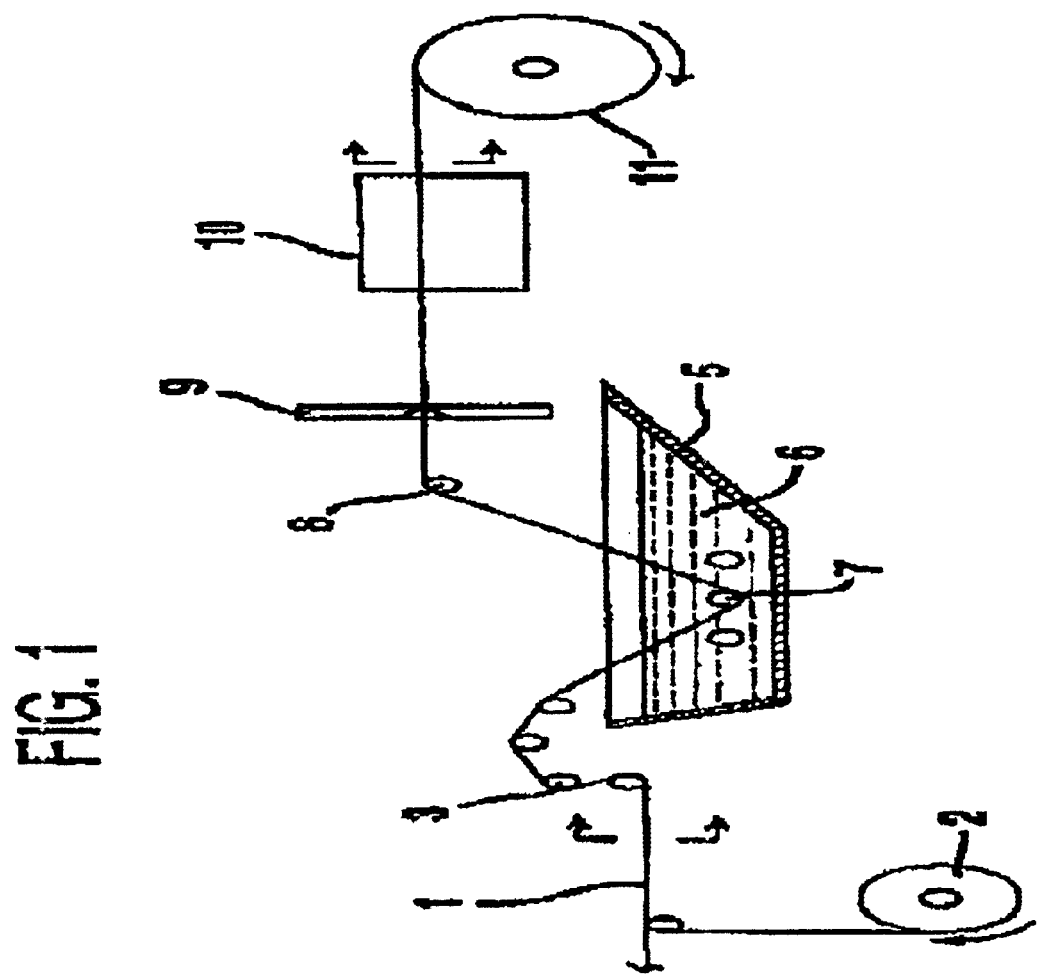

US 6,849,331 B1

POLYESTER RESIN STRING BINDER

FIELD OF THE INVENTION

The present invention relates generally to chemically treated reinforcing fibers, pre-forms made with the same, and polymer composites made with the same. More particularly, this invention relates to: reinforcing fibers having a chemical treatment comprising an emulsified polyester resin, a curing agent, a film former, and a thickener; pre-forms made with such fibers; and polymer composites made with such pre-forms.

BACKGROUND OF THE INVENTION

Fibers, such as glass fibers, are commonly used as reinforcements for synthetic polymer composites. These fiber reinforced composites are desirable for their combination of light weight and strength and are useful in a variety of applications including automobile components and housings for computers.

Conventional techniques may be used to make fiber reinforced composites and usually involve placing a pre-form in a mold and forming a polymer matrix around the pre-form. Methods for making pre-forms involve depositing chopped reinforcing fibers on to a porous form, consolidating the fibers by heating, and cooling to form a mat structure. For adequate consolidation and pre-form strength, a resin binder is usually incorporated before the heating step so that when heated, the resin flows across the fibers and acts as a binder. When the resin binder is a thermoset, a thermoset resin is incorporated before the heating step so that when heated, the thermoset resin flows across the fibers and acts as a thermoset binder when cured. The incorporation of a resin binder in order to economically produce adequate pre-forms continues to be a significant problem in the art.

One method of resin binder incorporation is known as the "wet laid" process involving the formation of an aqueous mixture of chopped glass fibers and resin binder, usually under agitation in a mixing tank. The resulting mixture may then be poured onto a porous mold or screen where suction is applied to remove liquid content. Another wet laid process involves depositing chopped fibers on a mold, spraying the fibers with an aqueous composition containing the resin binder. Alternatively, the chopped fiber can be sprayed with the aqueous composition while they are being chopped and deposited on the mold. The final step in all these processes is to heat the fibers on the mold causing the resin binder to flow and set. Unfortunately, due to the nature of glass fibers, it is difficult to obtain a uniform dispersion of fibers in a wet laid process. Poor fiber dispersion leads to undesirable qualities in a resultant pre-form such as poor structural strength. Additionally, a wet laid process often involves the use of volatile organic compounds (VOCs) and other organic solvents thereby triggering environmental safety concerns regarding their use.

In contrast to wet laid processes are "dry processes" where a resin binder is dry mixed with chopped fibers, heated to melt and cure the resin, and cooled to form a pre-form. Alternatively, a resin binder may be sprayed in molten form on to chopped fibers and cooled to form a pre-form. Unfortunately, an application of large quantities of resin binder is required in order to produce an acceptable pre-form. As a result, there is an undesirable generation of excess molten resin which may foul equipment and require extensive cleanup operations. Furthermore, when combined with a polymer matrix to form a reinforced composite, large quantities of resin binder present in a pre-form exacerbates any incompatibility between the resin binder and polymer matrix. Accordingly, there may be an increased likelihood of defects in the reinforced composite such as: 1) blistering, the result of undesirable chemical reactions between the resin binder and polymer matrix; 2) reduced bond strength between the pre-form and polymer matrix, also the result of undesirable chemical reactions; and 3) bleeding, the result of resin binder diffusing through the polymer matrix.

One solution to the problems caused by the aforementioned wet and dry processes is the production of string binders as disclosed in U.S. patent application Ser. No. 09/280,808, filed Mar. 30, 1999, entitled "String Binders" and U.S. patent application Ser. No. 09/593,550 filed Jun. 14, 2000, entitled "String Binders and Method for Making Same." These references generally disclose a string binder made by incorporating molten thermoset resin on a strand composed of gathered fibers and cooling. These resin incorporated strands may then be chopped, directed to a mold, heated to cause the resin to flow, and cured into a thermoset resin binder. When cooled, a pre-form with a thermoset resin binder is formed.

Despite the advantages string binders provide in eliminating many of the cumbersome steps of conventional processes, the current methods for producing string binders require the handling of molten thermoset resins. It would be desirable to avoid the expense and difficulty of providing thermoset resins in molten form. The present invention satisfies such by producing a string binder with an aqueous chemical treatment.

SUMMARY OF THE INVENTION

An object of the invention is a string binder comprising a fibrous substrate having a chemical treatment. The fibrous substrate preferably comprises glass filaments which are gathered into strands. The chemical treatment is applied to the fibrous substrate in aqueous form and comprises an emulsified polyester resin, a curing agent, a film former, a thickener, and water.

The chemical treatment may be applied by immersing the fibrous substrate in a bath comprising the chemical treatment. The chemically treated fibrous substrate may then be dried and wound on a winder. Chemically treated fibrous substrates made in such a manner belong to a general class referred herein as "string binders." The term "string binder" generally refers to fibrous substrates which incorporate a resin binder.

Another object of this invention is a pre-form comprising string binders. The pre-form may be made by chopping a string binder made in accordance with the present invention, directing the choppings on to a mold, heating to cause the chemical treatment applied to the string binder to melt, flow and cure into a thermoset resin binder. Alternatively, the pre-form may be made by weaving a plurality of string binder strands made in accordance with the present invention.

Yet another object of this invention is a reinforced composite comprising a polymer matrix and a pre-form. The pre-form is made with a string binder in accordance with the present invention. The reinforced composite may be made by placing the pre-form in a mold and forming the polymer matrix around the mat. The polymer matrix is preferably formed by reaction injection molding.

BRIEF DESCRIPTION OF THE DRAWINGS

FIG. 1 is an illustration of a preferred method of manufacturing the present invention.

DETAILED DESCRIPTION OF THE INVENTION

The present invention provides for a string binder that may be used in continuous or chopped form as a raw material in preparation of pre-forms. Such pre-forms impart desirable physical characteristics to a reinforced composite comprising a polymer matrix and the pre-forms. The pre-forms may be placed in a mold where a polymer matrix is formed around the mat to produce a reinforced composite.

Fibrous Substrate

The string binders of the present invention comprise a fibrous substrate. Any suitable fibrous substrate may be used in the invention. Preferably, the fibrous substrate may be selected from fibrous materials that are commonly known in the art, such as glass, carbon, natural fibers, polymers and other fiberizable materials known in the art, or mixtures thereof. Examples of fibrous substrates that may be used either alone or in combination with glass or carbon fibers include thermoplastics including polyesters such as DACRON®, polyaramids such as KEVLAR® and natural fibers. The fibrous substrate is preferably a fibrous material in the form of continuous strands composed of multiple filaments. The strands may take the form of yarns, or rovings. Preferably, the strands of fibrous substrate comprise reinforcing fibers. Typically, such strands, are formed by combining filaments of the reinforcing fibers as they are attenuated from a fiber-forming apparatus such as a bushing or orifice plate, although they may also be made by any method conventionally known in the art. The filaments may be coated with a suitable sizing composition. For example, a suitable sizing composition may comprise functional agents such as lubricants, coupling agents and film-forming polymers. After being coated with the sizing composition, the filaments may be gathered into strands. These strands may then be formed into yarns or rovings.

Preferably, the filaments making up the strands are glass and have a diameter preferably ranging from 3.5 to 24 $\mu$m and more preferably from 9 to 13 $\mu$m. The preferred filament diameters correspond to U.S. filament designations G, H, and K. In the method according to the invention, preferably the strand input has a yield of from 3,700 to 7,500 yd/lb., most preferably 7,500 yd/lb., or approximately 66 TEX a measurement reflecting the weight and thickness of the strand).

Chemical Treatment

The chemical treatment of the present invention comprises an emulsified polyester resin, a curing agent, a film former, a thickener, and water.

The chemical treatment preferably comprises the emulsified polyester resin in an amount of 25 to 75 wt. %, more preferably 35 to 65 wt. %, and most preferably from 45 to 55 wt. %. The emulsified polyester resin is preferably PE-412 available from OC Anderson.

The curing agent is preferably a peroxide. Preferably the curing agent is a benzoyl peroxide such as Cadox 40E available from Akzo Nobel. The chemical treatment preferably comprises benzoyl peroxide in an amount of 0.5 to 2.0 wt. %, more preferably 0.6 to 1.5 wt. %, and most preferably from 0.75 to 1.25 wt. %. Most preferably the curing agent is dieumyl peroxide such as Varox DCP-R available from RT Vanderbilt Company. The chemical treatment preferably comprises dieumyl peroxide in an amount of 0.25 to 1.60 wt. %, more preferably 0.4 to 1.4 wt. %, and most preferably from 0.50 to 1.20 wt. %.

The chemical treatment preferably comprises the film former in an amount of 5.0 to 25.0 wt. %, more preferably 7.0 to 18.0 wt. %, and most preferably from 8.0 to 12.0 wt. %. Any material capable of melting at elevated temperatures (e.g. greater than 200° F. (93° C.)) and forming a tack free film when cooled may be used as the film former in the present invention. Polyvinyl polymers are preferred film formers, with polyvinyl acetate more preferred, and epoxidized polyvinyl acetate as most preferred. An example of a preferred epoxidized polyvinyl acetate is DURACET 675-01 (commercially available from Franklin International).

The chemical treatment preferably comprises a thickener in sufficient amounts to adjust the viscosity of the chemical treatment in the range of between 1500 to 2500 cps. The viscosity of the chemical treatment is measured by a Brookfield LVF Viscometer (available from Brookfield Company) using spindle number 3 at 300 rpm. The thickener is preferably a water soluble polymer, most preferably an acrylic polymer. The chemical treatment preferably comprises an acrylic polymer in an amount of 0.05 to 0.50 wt. %, more preferably 0.10 to 0.25 wt. %, and most preferably from 0.10 to 0.15 wt. %. The acrylic polymer is preferably chosen from a group consisting of Carbopol 941 or Carbopol 981 available from B.F. Goodrich. The acrylic polymer is most preferably Carbopol 941.

Optional Ingredients

The chemical treatment may include optional ingredients which serve to impart desired properties to a fiber reinforced composites. For example, the chemical treatment may further comprise flame retardants and/or pigments.

Chemical Treatment Application

The chemical treatment of this invention may be applied to a fibrous substrate by any means known in the art. A preferred method is illustrated by FIG. 1 where a strand input (1) of a fibrous substrate, preferably an E-glass, is fed from a feed spool (2) through an optional tensioner bar arrangement (3). The strand input (1) may be passed through a bath (5) holding the chemical treatment (6) of this invention. The bath (5) is preferably equipped with conventional breaker bars (7) to guide the strand input (1) while it is submerged in the chemical treatment (6) which is preferably at room temperature (60–80° F. or 15–26° C.). After exiting the bath (5), the strand may be passed over at least one additional breaker (8) before being fed through a stripper die (9) to remove substantially all but the desired amount of treatment from the strand. The stripper die (9) is selected to have an orifice opening of the appropriate diameter to meter the desired amount of resin onto the fibrous substrate. The strand may then be passed through an oven (10) for drying. After exiting the oven (10) the strand is allowed to cool. The strand is then wound onto a product spool or collet (11) using any conventional winding apparatus. The rate at which the strand is wound depends upon the drying conditions, the composition of chemical treatment, and the amount of chemical treatment remaining on the strand once the excess has been removed. In short, the winding rate is preferably the maximum rate possible that allows the chemical treatment to dry on the strand before it is spooled, and is readily determined to an person ordinarily skilled in the art. Rates on the order of 80–750 ft/min (24–288 m/min) have been achieved.

Co-Roving

Fibrous substrates which are chemically treated in accordance with this invention ("string binders") may by themselves be used to make a pre-form or they may be co-roved with a reinforcing fiber material to form a multi-end roving product which in turn may be used to make a pre-form. This reinforcing fiber material may be selected from glass, polymer, natural fibers, or any combination thereof. Examples of such reinforcing fiber materials include, but are not limited to glass, KEVLAR, polyaramids, polyesters such as DACRON, and natural fibers such as linen, jute, hemp, cotton and sisal. Preferably, the reinforcing fiber material is in the form of a continuous roving. To form the co-roved multi-end product, one or more ends of string binder are roved together with one or more ends of a reinforcing fiber material, such as glass, using any conventional winding process. For example, roving ends from 1–3 wound spools of continuously formed string binder of the present invention may be lined up in a creel simultaneously with roving ends from 10–20 forming cakes of glass reinforcing fiber strand. Unlike the string binder of the present invention, the reinforcing fiber material used to make the co-roved product is not treated with the chemical treatment used to form the string binder. This reinforcing fiber material may, however, be sized with an acceptable sizing treatment before being co-roved with the string binder. Application of a sizing treatment typically provides certain desirable effects to the reinforcing fiber material, such as protection from damage by attrition or erosion, and enhances wetout of the fibers in the composite matrix, when molded. Preferably, the sizing treatment is applied to the strands of reinforcing fiber material before they are wound into forming cakes.

The combined ends of the string binder and reinforcing fiber material may then be co-roved or wound together onto a spool, thereby forming a multi-end roving having a proportionate amount of string binder within the roving. The proportion of string binder to the reinforcing fiber material may be varied according to the desired product specifications, the quantities of each being readily determined by one having ordinary skill in the art. Preferably, the proportion of string binder to reinforcing fiber material in the present invention ranges from 5 to 30% (more preferably 10 to 20%) by weight of string binder to 80% to 90% by weight of reinforcing fiber material.

Pre-Form

The string binder of the present invention and multi-end roving formed therefrom may be incorporated into several reinforcing articles, depending on the desired application. For example, the multi-end rovings may be used to form a woven fabric reinforcement, such as a woven roving or a multi-axial stitched reinforcement. Alternatively, the string binder and multi-end rovings formed therefrom may also be used, in continuous or chopped form, in various applications requiring an input of reinforcing fiber segments.

In an embodiment requiring input of chopped reinforcing fiber segments, the string binder, or, preferably, the multi-end roving comprising the string binder, may immediately be chopped into segments instead of being spooled after forming. Preferably, the length of such segments is typically from ½ inch (1.27 cm) up to 3 inches (7.62 cm) in length. Most preferably, the chopped segments are from 1 inch (2.54 cm) to 3 inches (7.62 cm) in length.

The segments obtained according to the aforementioned procedure are preferably used to make pre-forms using a spray-up process. Such a process is described in U.S. Pat. No. 3,170,197, which is herein fully incorporated by reference for U.S. patent practice. In a particularly preferred embodiment including this method, segments of a multi-end roving comprising the string binder are blown or spread by conventional means over a shaped pre-form screen and a sufficient level of heat applied to melt and flow the chemical treatment enough to permit some fusing of the segments and curing of the thermoset resin. Preferably, suction is applied to promote compacting of the segments as they fuse. The process of fusing allows the layered material to conform to the shape of the pre-form screen, and the material is then set into a solid matted structure or pre-form that may be physically transported if necessary to another location to complete the molding process that forms the final composite product.

Where the reinforcing article is a pre-form, it may typically comprise from 10% to 20% by weight of the string binder, in combination with from 80% to 90% by weight of another pre-form material. The weight ratio of the amount of fibrous carrier substrate to the amount of dried chemical treatment in the string binder preferably ranges from 99:1 to 85:15 with 94:6 most preferred. To make the pre-form, the chopped segments may be laid up on a consolidation screen, and optionally compressed using suction drawn through the screen to form the material into a desired shape that conforms to the contour of the screen. Consolidation may also be accomplished by placing a second screen on top of the pre-form prior to heating.

Reinforced Composite

The pre-form of this invention may be used in otherwise conventional molding processes to make a reinforced composite comprising the pre-form and a polymer matrix. Typically, the pre-form is placed in a mold cavity into which a moldable polymer matrix material is injected or otherwise added. Any moldable polymer matrix material that is compatible with the thermoset polymer material of the string binder in the pre-form may be used. Typical moldable polymer matrix resins that may be used include vinyl esters, polyesters, urethanes and phenolic thermoplastics. Preferably, the moldable polymer matrix is a urethane polymer that is compatible with the thermoset polymer material that is present in the string binder. For example the pre-form may be placed in a mold in which a isocyanate and a polyol may be injected to react and form a urethane polymer reinforced by the pre-form. The skilled artisan will be able to identify other moldable matrix resin materials suitable for use with pre-forms made according to this invention without undue experimentation.

EXAMPLES

It will be appreciated by those skilled in the art that changes could be made to the embodiments described above without departing from the broad inventive concept thereof. It is understood, therefore, that the invention is not limited to the particular embodiments disclosed, but it is intended to cover modifications and equivalents which are within the spirit and scope of the invention, as defined by the appended claims.

A chemical treatments were made by mixing the ingredients as listed in the tables below. These chemical treatments were then applied to a glass fibers in accordance with the invention. The chemically treated fibers were then chopped and then manufactured into a pre-forms in accordance with the invention. The pre-forms were then used to make a reinforced composite in accordance with the invention.

| Ingredient | wt. % as received |
| --- | --- |
| PE-412 (53.5% solids) | 50.0 |
| Cadox 40E | 1.0 |
| Duracet 675-01 (55.0% solids) | 10.0 |
| Carbopol 941 (is this the right number?) | 1.0 |
| Deionized Water | remainder |
| PE-412 (53.5% solids) | 50.0 |
| Varox DCP-R* | 0.53 |
| Acetone | 1.59 |
| Igepal CA 630 (alkyl phenol surfactant)** | 0.35 |
| Duracet 675-01 (55.0% solids) | 10.0 |
| Carbopol 941 | 1.0 |
| Deionized Water | remainder |

*Varox DCP-R was delivered as a dispersion in acetone, Igepal CA 630, and deionized water.
**Igepal is available from GAF Chemicals

We claim:

1. Reinforcing fibers having an applied chemical treatment wherein said applied chemical treatment is applied as an aqueous treatment comprising an emulsified polyester resin, a cursing agent, an epoxidized polyvinyl acetate film former, a thickener polymer, and water, wherein the applied chemical treatment on the reinforcing fibers is from 5% to 30% by weight.

2. The reinforcing fibers of claim 1 wherein the applied chemical treatment is dried.

3. The reinforcing fibers of claim 1 wherein the curing agent is a peroxide.

4. The reinforcing fibers of claim 1 wherein the curing agent is chosen from the group consisting of benzoyl peroxide, dieumyl peroxide, and mixtures thereof.

5. The reinforcing fibers of claim 1 wherein the film former is a vinyl polymer.

6. The reinforcing fibers of claim 1 wherein the thickener is a water soluble polymer.

7. The reinforcing fibers of claim 1 wherein the thickener is an acrylic polymer.

8. The reinforcing fibers of claim 1 wherein the water is deionized water.

9. The reinforcing fibers of claim 2 wherein said reinforcing fibers form a strand having the applied chemical treatment.

10. A reinforcing fiber mat comprising the reinforcing fibers of claim 9.

11. A composite comprising a polymer matrix and the reinforcing fiber mat of claim 10.

* * * * *